(12) United States Patent
Sun (10) Patent No.: US 11,101,607 B1
(45) Date of Patent: Aug. 24, 2021

(54) CONNECTOR AND METHOD FOR CHARGING CONTROL WITH THE CONNECTOR

(71) Applicant: Matrixed Reality Technology Co., Ltd., Wuxi (CN)

(72) Inventor: Pengda Sun, Beijing (CN)

(73) Assignee: Matrixed Reality Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/256,882

(22) PCT Filed: Jun. 4, 2020

(86) PCT No.: PCT/CN2020/094334
§ 371 (c)(1),
(2) Date: Dec. 29, 2020

(87) PCT Pub. No.: WO2020/253543
PCT Pub. Date: Dec. 24, 2020

(30) Foreign Application Priority Data

Jun. 21, 2019 (CN) .......................... 201910542150.8

(51) Int. Cl.
*H01R 13/703* (2006.01)
*G06F 13/42* (2006.01)
*H02J 7/00* (2006.01)

(52) U.S. Cl.
CPC ..... *H01R 13/7039* (2013.01); *G06F 13/4282* (2013.01); *H02J 7/0045* (2013.01); *G06F 2213/0042* (2013.01)

(58) Field of Classification Search
CPC . H02J 7/0045; H01R 13/7039; G06F 13/4282
See application file for complete search history.

(56) References Cited

U.S. PATENT DOCUMENTS 10,224,679 B1* 3/2019 Chen .................. H01R 13/7037
10,817,449 B2* 10/2020 Liu ....................... G06F 13/4295
(Continued)

FOREIGN PATENT DOCUMENTS

CN 102347626 A 2/2012
CN 108963673 A 12/2018
(Continued)

*Primary Examiner* — Jean F Duverne
(74) *Attorney, Agent, or Firm* — Preti Flaherty Beliveau & Pachios LLP (57) ABSTRACT

The present disclosure provides a connector for coupling a first electronic device and a second electronic device with a power source to enable the power source to provide a current to the first electronic device and the second electronic device, the connector includes: a first connector component; a second connector component; a third connector component; a power line coupled with the first connector component, the second connector component, and the third connector component; a first data line; and a signal switching circuit, configured to: detect whether the third connector component is coupled with the power source; control the first connector component and the second connector component to be coupled when it is not detected that the third connector component is coupled with the power source; and when it is detected that the third connector component is coupled with the power source: control the first connector component and the third connector component to be coupled, to send a power source connection message to the first electronic device via the first data line; or control the second connector component and the third connector component to be coupled, to send a power source connection message to the second electronic device via the first data line.

20 Claims, 5 Drawing Sheets

(56) References Cited

U.S. PATENT DOCUMENTS

2017/0222459 A1    8/2017  Kang
2020/0068306 A1*  2/2020  Chen ........................ H04R 5/04

FOREIGN PATENT DOCUMENTS

| CN | 110247264 A | 9/2019 |
|---|---|---|
| CN | 209881017 U | 12/2019 |

* cited by examiner

CONNECTOR AND METHOD FOR CHARGING CONTROL WITH THE CONNECTOR

FIELD

The present disclosure relates to the field of electronic communication, and more particularly to a connector and a method for charging control with the connector.

BACKGROUND

Currently, there are application scenarios where a connector is used to connect two electronic devices to perform data transmission between them. In these application scenarios, data transmission consumes a large amount of power. Since the number of connector ports of the electronic device is usually limited (usually one), it is impossible to supply power to the electronic device by an external power source. When an electronic device runs out of power, a user has to stop using the device and charge it with its connector port. Therefore, a connector that provides power supplying with an external power source during data transmission between electronic devices is needed for the related art.

SUMMARY

In view of the foregoing, the present disclosure provides a connector and a method for charging control with the connector. With the connector and the method, by configuring a third connector component to be connected to a power source, the power source supplies power to a second electronic device during data transmission between a first electronic device and the second electronic device can be implemented.

According to an aspect of the present disclosure, a connector configured to couple a first electronic device and a second electronic device with a power source to enable the power source to provide a current to the first electronic device and the second electronic device is provided, in which the first electronic device is able to communicatively connected to the second electronic device via the connector and supply power to the second electronic device, the connector includes: a first connector component configured to be coupled with the first electronic device; a second connector component configured to be coupled with the second electronic device; a third connector component configured to be coupled with the power source; a power line configured to be coupled with the first connector component, the second connector component, and the third connector component; a first data line configured to operatively couple any two of the first connector component, the second connector component, and the third connector component via a signal switching circuit; and the signal switching circuit is configured to: detect whether the third connector component is coupled with the power source; control the first connector component and the second connector component to be coupled via the first data line when it is not detected that the third connector component is coupled with the power source; and when it is detected that the third connector component is coupled with the power source: control the first connector component and the third connector component to be coupled via the first data line, to send a power source connection message to the first electronic device via the first data line; or control the second connector component and the third connector component to be coupled via the first data line, to send a power source connection message to the second electronic device via the first data line. The power source connection message is configured to indicate that the third connector component is coupled with the power source.

Optionally, in an example, the connector may further include a second data line, coupling the first connector component with the second connector component.

Optionally, in an example, the signal switching circuit may be further configured to: control the first connector component and the second connector component to be coupled after sending the power source connection message to the first electronic device or the second electronic device via the first data line.

Optionally, in an example, the power source connection message may further include power configuration information.

Optionally, in an example, the power line may be operatively coupled with the third connector component via the signal switching circuit, and the signal switching circuit is further configured to: obtain a power-supplying state of the first electronic device at which the first electronic device supplies power to the second electronic device via the power line after sending the power source connection message to the first electronic device or the second electronic device via the first data line; and cause the third connector component to be coupled with the power line in response to the first electronic device stopping supplying power to the second electronic device via the power line, to enable the power source to supply power to the first electronic device and the second electronic device.

Optionally, in an example, the first connector component and the second connector component may be of the same type.

Optionally, in an example, the first connector component and the second connector component may be any one of: a Universal Serial Bus Type-C connector component; a Universal Serial Bus Lightning connector component; a Universal Serial Bus Type-B connector component; a Universal Serial Bus Type-A connector component; a Mini Universal Serial Bus component.

Optionally, in an example, the connector may be fixed in a non-detachable manner according to the second connector component and the second electronic device.

Optionally, in an example, the signal switching circuit may be arranged adjacent to the first connector component or the second connector component.

Optionally, in an example, the first data line, the second data line and the power line may be integrated into a connecting cable.

Optionally, in an example, the connecting cable may be formed as a branched connecting cable, the first connector component is located at a first end of the connecting cable, the second connector component is located at a second end of the connecting cable, and the third connector component is located at a branch end of the connecting cable.

Optionally, in an example, the connector may further include a housing capable of accommodating the first electronic device, in which the connecting cable is fixed on the housing, and the second connector component extends outward from the housing.

Optionally, in an example, the signal switching circuit may be arranged within the connecting cable.

Optionally, in an example, the second electronic device may be a wearable augmented reality device or a wearable virtual reality device.

According to another aspect of the present disclosure, a method for power-supplying control with the connector described above is also provided, which includes: detecting whether the third connector component is coupled with the power source; controlling the first connector component and the second connector component to be coupled when it is not detected that the third connector component is coupled with the power source; and when it is detected that the third connector component is coupled with the power source: controlling the first connector component and the third connector component to be coupled via the first data line, to send a power source connection message to the first electronic device via the first data line; or controlling the second connector component and the third connector component to be coupled via the first data line, to send a power source connection message to the second electronic device via the first data line. The power source connection message is configured to indicate that the third connector component is coupled with the power source via the first data line.

With the connector of the present disclosure, by providing the third connector component coupled with the power source, power supplying to the first electronic device and the second electronic device by the power source during data transmission between the first electronic device and the second electronic device can be implemented, thereby, the use time of the first electronic device and the second electronic device can be increased. In addition, by setting a signal switching circuit and using the signal switching circuit to control the first data line to couple the second electronic device and the third connector component or to couple the first electronic device and the third connector component when accessing the power source, in order to send the power source connection message to the second electronic device or the first electronic device, therefore it is not required to set a signal transmission line dedicated to transmitting the power source connection message.

With the connector of the present disclosure, by transmitting the power source configuration information to the second electronic device, the second electronic device can send the power-supplying stop message to the first electronic device when the power source configuration information indicates that the connected power source has the ability to supply power to the second electronic device, so that the first electronic device stops supplying power to the second electronic device and performs power source state transition. This can prevent the second electronic device from failing to work properly after the first electronic device stops supplying power to the second electronic device.

With the connector of the present disclosure, by configuring the second data line that couples the first connector component and the second connector component, the first electronic device and the second electronic device can transmit data normally during the transmission of the power source connection message upon the power source access.

With the connector of the present disclosure, after the power source connection message is sent to the second electronic device via the first data line, the first connector component is controlled to be coupled with the second connector component, so that the first electronic device and the second electronic device can perform data transmission via the first data line.

With the connector of the present disclosure, by arranging the signal switching circuit adjacent to the first connector component or the second connector component, the user usage is facilitated.

BRIEF DESCRIPTION OF THE DRAWINGS

By referring to the following appended drawings, a further understanding of the nature and advantages of the present disclosure may be achieved. In the appended drawings, similar components or features may have the same reference label. The appended drawings are used to provide a further understanding of the embodiments of the present invention and constitute a part of the specification, and used to, together with the following detailed description, explain the embodiments of the present disclosure, but do not constitute a limitation to the embodiments of the present disclosure.

DESCRIPTION OF REFERENCE LABEL

| | |
|---|---|
| 110: first electronic device | 111: first device-end connector |
| 120: second electronic device | 121: second device-end connector |
| 131: first connector component | 132: second connector component |
| 133: third connector component | 134: first data line |
| 135: signal switching circuit | 136: second data line |
| 210: first electronic device | 211: first connector port |
| 220: second electronic device | 221: second connector port |
| 230: connector | 231: connecting cable |
| 2311: first connector component | 2312: second connector component |
| 2313: first data line portion | 2314: first data line portion |
| 2315: first data line portion | 232: third connector component |
| 233: power-supplying state detection circuit | 234: power-supplying control circuit |
| 2341: switch control signal transmission port | 2342: data transmission port |
| 235: signal switch circuit | 2351: first data port |
| 2352: second data port | 2353: third data port |
| 2354: switch state control port | 240: power source |
| 310: first electronic device | 320: second electronic device |
| 330: power source | 340: third connector component |
| 350: power-supplying state detection circuit circuit | 360: power-supplying control |
| 370: signal switch circuit | |

DETAILED DESCRIPTION

The subject described herein will be discussed below with reference to example embodiments. It should be understood that the discussion of these embodiments is only to enable those skilled in the art to better understand and implement the subject described herein, and is not to limit the scope, applicability or examples set forth in the claims. The functions and arrangements of the discussed elements may be changed without departing from the scope of the present disclosure. Various examples may omit, replace or add various processes or components as needed. In addition, features described with respect to some examples may also be combined in other examples.

As used herein, the term "including" and its variants represents open terms, meaning "including but not limited to". The term "based on" represents "based at least in part on". The terms "one embodiment" and "an embodiment" represent "at least one embodiment". The term "another embodiment" represents "at least one other embodiment". The terms "first", "second", etc. may refer to different or the same objects. Other definitions can be included below, either explicit or implicit. The definition of a term is consistent throughout the description, unless clearly indicated in the context.

Herein, the term "couple" refers to direct mechanical connection, communication or electrical connection between two components, or indirect mechanical connection, communication or electrical connection through intermediate components. Likewise, the couple may refer to a direct electrical connection between two components, or an indirect electrical connection through intermediate components. The electrical connection may be implemented in a wired manner or a wireless manner.

Now, a connector and a method for charging control with the connector of the present disclosure are described in conjunction with the accompanying drawings.

Figure 1:
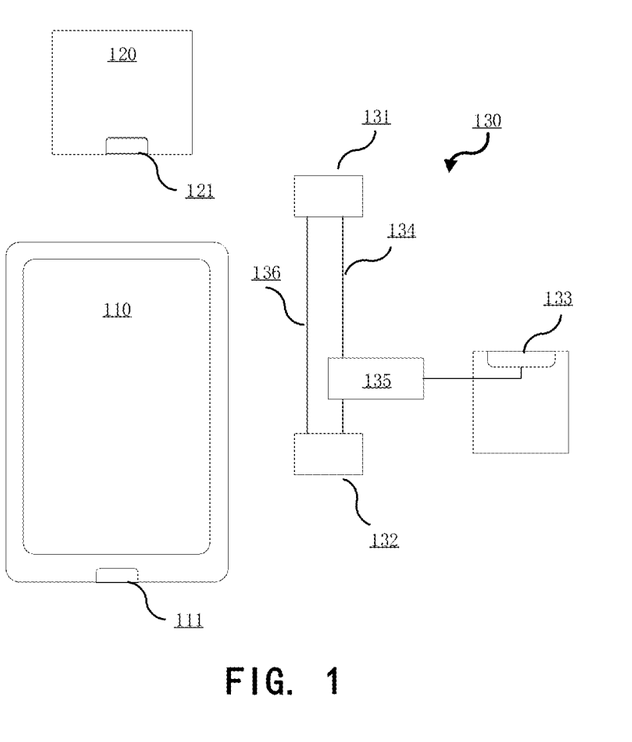
FIG. 1 is a schematic diagram of a connector, a first electronic device, and a second electronic device according to an embodiment of the present disclosure, in which the connector is applicable to the first electronic device and the second electronic device.

FIG. 1 is a schematic diagram of a connector, a first electronic device, and a second electronic device according to an embodiment of the present disclosure, in which the connector is applicable to the first electronic device and the second electronic device.

As shown in FIG. 1, the connector 130 is used to cause the first electronic device 110 to be coupled with the second electronic device 120. When the first electronic device 110 is coupled with the second electronic device by the connector 130, the first electronic device 110 can use its own power source to supply power to the second electronic device through a power line of the connector 130 (not shown in FIG. 1), and data can be transmitted between the first electronic device 110 and the second electronic device through a data line of the connector 130. The second electronic device 120 itself may not have a power source or may have a power source. The first electronic device 110 may be, e.g., a smart phone, a tablet computer, a desktop computer, or other devices. The second electronic device 120 may be, e.g., a wearable virtual reality device (such as VR glasses), a wearable augmented reality device (such as AR glasses), a smart bracelet, a smart phone, a display device, etc. Generally, the first electronic device 110 is the master device and the second electronic device 120 is the slave device, and the master device can communicate data (a video, an audio file, a picture, etc.) to the slave device for various operations of the slave device (such as display operation).

As an example, the first electronic device 110 may be a smart phone, and the second electronic device 120 may be VR/AR glasses. When a smart phone is coupled with VR/AR glasses by a connecting cable (such as a USB cable), the smart phone may transfer video, audio file and other data to the VR/AR glasses through a data line of the connecting cable, thereby displaying VR/AR effects on the VR/AR glasses. Meanwhile, if the VR/AR glasses do not have power source, the smart phone can supply power to the VR/AR glasses through a power line of the connecting cable. Alternatively, even if the VR/AR glasses have power source, since data display and data processing consume a large amount of power, the first electronic device can also supply power to the VR/AR glasses. In this case, data transmission, and the data display and data processing operations of the second electronic device 120 consume a large amount of power, and when a connecting cable in the related art is used, the external power source cannot be used for power supplying. When the power is depleted, usage must be suspended, and the first electronic device 110 and/or the second electronic device 120 must be charged before resuming the usage.

However, with the connector 130 shown in FIG. 1, an external power source supply power during data transmission between the first electronic device 110 and the second electronic device 120 can be implemented.

The first electronic device 110 can have a first device-end connector 111, and the second electronic device 120 can have a second device-end connector 121. The connector 130 has a first connector component 131 and a second connector component 132, which can be mated with the first device-end connector 111 and the second device-end connector 121 respectively, to be coupled with the first electronic device 110 and the second electronic device 120 respectively. In an example, the first device-end connector 111 and the second device-end connector 121 may be connector ports, and the first connector component 131 and the second connector component 132 may be connector plugs mated with the connector ports. When the first connector component 131 and the second connector component 132 are inserted into the first device-end connector 111 and the second device-end connector 121, respectively, the first connector component 131 and the second connector component 132 can be coupled with the first electronic device and the second electronic device, respectively.

The connector 130 also includes a third connector component 133 coupled with the power source. The third connector component 133 may be mated with the power source connector component. In an example, the power source connector component may be a connector plug, and the third connector component 133 may be a connector port mated with the power source connector component. When the power source connector component is inserted into the third connector component, the power source can be coupled with the third connector component.

The connector 130 further includes a first data line 134, a second data line 136, and a signal switching circuit 135. The first data line 134 operatively couples any two of the first connector component 131, the second connector component 132, and the third connector component 133 via the signal switching circuit 135.

When it is not detected that the third connector component 133 is coupled with the power source, the signal switching circuit 135 controls the first connector component 131 to be coupled with the second connector component 132 via the first data line 134, so that the first electronic device 110 can perform data transmission with the second electronic device 120 via the first data line 134. At this point, the first electronic device 110 may supply power to the second electronic device 120 via the power line.

When it is detected that the third connector component 133 is coupled with the power source, the signal switching circuit 135 controls the first connector component 131 to be coupled with the third connector component 133 via the first data line 134. At this point, the third connector component 133 may be coupled with the first electronic device 110 via the signal switching circuit 135 to send a power source connection message to the first electronic device 110 via the first data line 134. The power source connection message is used to indicate that the third connector component 133 is coupled with the power source. Alternatively, the signal switching circuit 135 may also control the second connector component 132 to be coupled with the third connector component 133 via the first data line 134, so that the third connector component 133 is coupled with the second electronic device 120 via the signal switching circuit 135, in order to send a power source connection message to the second electronic device 120 via the first data line 134.

The power source connection message is used to inform the first electronic device 110 or the second electronic device 120 that the power source has been accessed. Since the power line of the connector 130 is coupled with the first connector component 131, the second connector component 132, and the third connector component 133, when the power source is coupled with the third connector component 133, the second electronic device 120 can be supplied with power by the power source. When the first electronic device 110 receives the power source connection message, it may be determined that the second electronic device does not need to be supplied with power. At this point, and thus an internal power source state of the first electronic device can be converted into a power-receiving state. Therefore, the power source may charge the first electronic device. When the second electronic device 120 receives the power source connection message, it can be determined that there is a power source supplying power for the second electronic device. At this point, and therefore a power-supplying-stop message may be sent to the first electronic device 110 to inform the first electronic device 110 to stop supplying power to the second electronic device 120. Therefore, after stopping supplying power to the second electronic device, the first electronic device converts its internal power source state to a power-receiving state to charge itself with the power source. The first electronic device 110 may perform the Power Swap process in the Power Delivery (PD) protocol to set the power source state as the power-receiving state.

The power line may also be operatively coupled with the third connector component 133 via the signal switching circuit 135. As an example, a power switch for controlling connection and disconnection between the power line and a power terminal of the third connector component may be provided in the signal switching circuit to control the coupling or disconnection between the power line and the third connector component. At this point, the signal switching circuit 135 may also be configured to, after sending a power source connection message to the first electronic device 110 or the second electronic device 120 via the first data line 134, obtain a power-supplying state of the first electronic device 110 at which the first electronic device supplies power to the second electronic device 120 via the power line. For example, the signal switching circuit 135 may detect whether there is a current in the power line coupling the first electronic device and the second electronic device, and when there is no current, it indicates that the first electronic device 110 has stopped supplying power to the second electronic device 120. Then, the signal switching circuit 135 may, responding to the first electronic device 110 stopped supplying power to the second electronic device 120 via the power line, couple the power terminal of the third connector component 133 to the power line, so that the power line is connected to the power source, thereby supplying power to the first electronic device 110 and the second electronic device 120.

In an example, the signal switching circuit 135 may also be configured to, after that the first data line 134 sends the power source connection message to the first electronic device 110 or the second electronic device 120, control the first connector component 131 to be coupled with the second connector component 132 via the first data line 134. Therefore, after sending the power source connection message to the first electronic device 110 or the second electronic device 120, the first electronic device 110 and the second electronic device 120 can continue to use the first data line 134 for data transmission.

As shown in FIG. 1, the connector 130 also has a second data line 136. The second data line 136 is coupled with the first connector component 131 and the second connector component 132 to transmit data via the second data line when the first electronic device is connected to the second electronic device. In another example, the connector 130 may not include the second data line 136. When the second data line 136 is included, since data transmission may be implemented with the second data line 136, the signal switching circuit 135 may not cause the first data line to be coupled with the first connector component 131 and the second connector component 132 after sending the power source connection message.

Figure 2A:
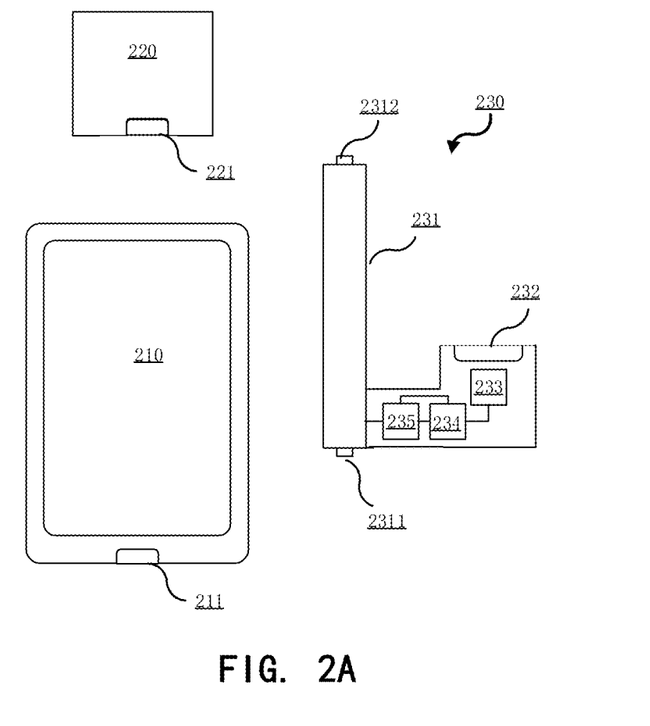
FIG. 2A is a schematic diagram of a connector, a first electronic device, and a second electronic device according to another embodiment of the present disclosure, in which the connector is applicable to the first electronic device and the second electronic device.
Figure 2B:
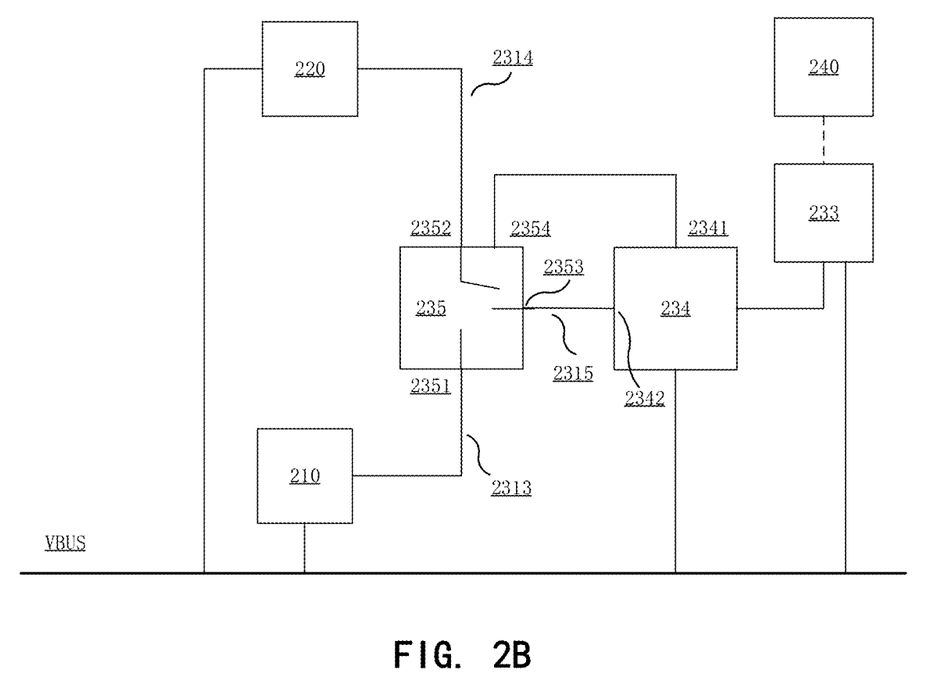
FIG. 2B is a schematic diagram of a various circuit connection relationship when the connector shown in FIG. 2A connects the first electronic device to the second electronic device.

FIG. 2A is a schematic diagram of a connector, a first electronic device, and a second electronic device according to another embodiment of the present disclosure, in which the connector is applicable to the first electronic device and the second electronic device. FIG. 2B is a schematic diagram of a various circuit connection relationship when the connector shown in FIG. 2A connects the first electronic device to the second electronic device.

As shown in FIG. 2A, the connector 230 is used to couple a first electronic device 210 to a second electronic device 220.

The first electronic device 210 may have a first connector port 211, and the second electronic device 220 may have a second connector port 221. The first electronic device 210 may have adaptation circuits coupled with the first connector port 211, and the second electronic device 220 may have adaptation circuits coupled with the second connector port 221. In embodiments of the present disclosure, the adaptation circuit is coupled with the connector port or a connecting cable (in an example in which the connector port and a connector plug are not used). When the connector plug of the connecting cable is inserted into the connector port, the data line of the connecting cable is connected to a data transmission port of the adaptation circuit, and a signal or data are transmitted through the connecting cable, meanwhile, the power line of the connecting cable is connected to a power line of the adaptation circuit or the electronic device to supply power to the electronic device. In an embodiment, the adaptation circuit can also perform the Power Deliver (PD) protocol. The adaptation circuit can also detect and determine an insertion direction of the connector plug, and configure the data transmission port according to the insertion direction. For example, the connector plug and the connector port may be Type-C, Lightning and other types of plugs that may be plugged in front and back, in which cases, the adaptation circuit may configure the data port of the connector port according to the insertion direction of the connector plug. The adaptation circuit is the adaptation circuit of the corresponding first electronic device and the second electronic device. For example, for a smart phone, its adaptation circuit may be a part of a main control circuit of the phone. For VR/AR glasses, the adaptation circuit may be a part of its internal circuit.

As shown in FIG. 2A, a first data line, a power line, and a second data line (if any) may be integrated into a connecting cable 231. At this point, a first connector component 2311 and a second connector component 2312 may be provided at both ends of the connecting cable 231. In addition, as shown in FIG. 2A, the connecting cable may be formed as a branched cable, and a third connector component 232 may be formed as a branched end of the branched cable. The third connector component may be any type of connector plug or any type of connector port.

In FIGS. 2A and 2B, the signal switching circuit may include a power-supplying state detection circuit 233, a power-supplying control circuit 234, and a signal switch circuit 235, all of which may be provided on a same printed circuit board. It should be noted that the signal switching circuit may also be implemented by other circuit compositions that can realize functions of the present disclosure. For example, the power-supplying state detection circuit and the power-supplying control circuit may be integrated into one circuit. The signal switching circuit may be arranged adjacent to the first connector component 2311 or the second connector component 2312. Since the user may need to hold or move the first electronic device or the second electronic device when using the first electronic device and the second electronic device, by arranging the printed circuit board adjacent to the first connector component or the second connector component, a larger or heavier part of the connector can be adjacent to the first electronic device or the second electronic device, and the user can conveniently user move or hold it.

In an example, the connector of the present disclosure may further include a housing capable of accommodating the first electronic device, the connecting cable is fixed on the housing, and the second connector component extends outward from the housing. At this point, the signal switching circuit may be arranged within the connecting cable 231, and may also be arranged within the housing. At this point, the third connector component 232 may be provided adjacent to a position where the power-supplying state detection circuit 233 is provided. In an example, the first connector component may be provided at a position on the housing that is adjacent to a device end connector of the first electronic device, so as to facilitate the first connector component coupling with the first electronic device when the first electronic device is provided inside the housing. The third connector component may extend outward from the housing, or may be provided on the housing, e.g., may be provided on a side of the housing.

As shown in FIG. 2B, a first data line of the connecting cable 231 may include first data line portions 2313, 2314, and 2315. The first data line portion 2313 and the first data line portion 2314 are respectively coupled with the first connector component 2311 and the second connector component 2312 (in which the connector component is omitted in FIG. 2B), and the first data line portion 2315 is coupled with the signal switch circuit 235 and the power-supplying control circuit 234. The signal switch circuit 235 is provided among the first data line portion 2313, the first data line portion 2314 and the first data line portion 2315. The power line (not shown in the drawings) of the connecting cable 231 may be coupled with a power terminal of the third connector component 232. The power line may also be operatively coupled with the power terminal of the third connector component 232 via the power-supplying control circuit 234. In the example shown in FIG. 2B, the power line of the connecting cable 231 is coupled with the power terminal of the third connector component 232 through a power bus (VBUS), and the power line is coupled with the first connector component 2311, the second connector component 2312, and the third connector component 232 through the power bus.

The power-supplying state detection circuit 233 is coupled with the third connector component 232. The power-supplying state detection circuit 233 may be configured to detect whether the power source connector component is coupled with the third connector component 232 to supply power. For example, the power-supplying state detection circuit 233 may detect whether the power source connector plug is inserted into the third connector component 232 in the form of a port. The power-supplying state detection circuit 233 may also be configured to obtain power configuration information of the power source, e.g., parameters such as voltages and currents, etc. The power configuration information can reflect power-supplying capability of the power source. The power-supplying state detection circuit 233 may also be configured to detect an insertion direction of the power source connector component, and configure a data transmission port of the third connector component 232 according to the insertion direction.

Referring to FIG. 2B, the power-supplying control circuit 234 is coupled with the power-supplying state detection circuit 233 and the signal switch circuit 235. A switch control signal transmission port 2341 of the power-supplying control circuit 234 is connected to a switch state control port 2354 of the signal switch circuit 235, sending a switch state control signal to the signal switch circuit 235 through the switch control signal transmission port 2341 to control a signal switch state. The signal switch circuit 235 may be configured to cause a first data port 2351 to be connected to the first data line portion 2313, a second data port 2352 to be connected to the first data line portion 2314, and a third data port 2353 to be connected to a data transmission port 2342 of the power-supplying control circuit 234. Thus, when the connecting cable 231 connects the first electronic device to the second electronic device, the first data port 2351, the second data port 2352, and the third data port 2353 of the control signal switch circuit 235 may be controlled to enable any two of the first electronic device 210, the second electronic device 220, and the power-supplying control circuit 234 to be coupled.

As shown in FIG. 2B, when it is not detected that the power source 240 is coupled with the third connector component 232, the power-supplying control circuit 234 may send a switch control signal to the signal switch circuit 235 through the switch control signal transmission port 2341, to enable coupling of the first data line portion 2313 and the first data line portion 2314 by controlling the signal switch circuit 235. At this point, the first data port 2351 and the second data port 2352 are connected, and the first electronic device 110 and the second electronic device 120 can perform normal data transmission via the first data line portion 2313 and the first data line portion 2314. Meanwhile, the first electronic device configures its power source state as a power-supplying state, and supplies power to the second electronic device 120 via the power line of the connecting cable 231.

For example, as for a smart phone and VR/AR glasses, after the first connector component and the second connector component are respectively coupled with the smart phone and the VR/AR glasses, if the third connector component is not coupled with the power source, the smart phone can enter a display data output mode to output display data to the VR/AR glasses via the connecting cable. Meanwhile, the PD protocol can be performed between the smart phone and the VR/AR glasses, which will cause the smart phone to convert the power source state to a power-supplying state, supplying power to the VR/AR glasses.

When it is detected that the power source 240 is coupled with the third connector component 232, the power-supplying control circuit 234 can control the signal switch circuit 235 to cause the first data line portion 2314 to be coupled with the first data line portion 2315, so that the second electronic device 220 is coupled with the power-supplying control circuit 234. As shown in FIG. 2B, the second data port 2352 can be connected to the third data port 2353 at this point. Thus, the power-supplying control circuit 234 can send a power source connection message to the second electronic device 220 via the first data line portion 2314 and the first data line portion 2315. The power source connection message is used to inform the second electronic device that the power source 240 which supplies power to the second electronic device has been connected. Subsequently, the second electronic device can transmit a power-supplying-stop message to the first electronic device to inform the first electronic device to stop supplying power to the second electronic device. After receiving the power-supplying-stop message, the first electronic device can convert its power source state into a power-receiving state to charge itself with the power source.

In addition, when it is detected that the power source 240 is coupled with the third connector component 232, the power-supplying control circuit 234 may also control the signal switch circuit 235 to cause the first data line portion 2313 to be coupled with the first data line portion 2315, so that the first electronic device 210 is coupled with the power-supplying control circuit 234. As shown in FIG. 2B, the first data port 2351 may be connected to the third data port 2353 at this point. Thus, the power-supplying control circuit 234 may send a power source connection message to the first electronic device 210 via the first data line portion 2313 and the first data line portion 2315. After receiving the power source connection message, the first electronic device may convert its power source state into a power-receiving state.

After sending the power source connection message to the first electronic device 210 or the second electronic device 220, the power-supplying control circuit 234 may control the signal switch circuit 235 to connect the first data line portion 2313 to the first data line portion 2314. Thus, the first electronic device 210 and the second electronic device 220 may perform data transmission via the first data line.

Therefore, power supplying to the first electronic device and the second electronic device by the power source 240 can be implemented during normal data transmission between the first electronic device and the second electronic device. In addition, the first data line is controlled by the power-supplying control circuit 234 and the signal switch circuit 235, which can implement message and data transmission, thereby implementing message transmission without providing an additional message transmission line.

In an example, the power source connection message may include power configuration information. The second electronic device 220 may determine whether to send a power-supplying-stop message to the first electronic device 210 based on the power source configuration message. When receiving the power configuration information, the second electronic device can determine whether the power source has ability to supply power to the second electronic device according to the power source configuration information. For example, it may be determined whether a voltage, a current, etc. provided by the power source meets power requirements of the second electronic device. Then, the second electronic device 220 may transmit a power-supplying-stop message to the first electronic device 210 when the power source has the ability to supply power to the second electronic device, so as to stop the first electronic device from supplying power to the second electronic device. The first electronic device 210 may also determine whether to stop supplying power to the second electronic device 120 based on the power source configuration information, and may also configure the power source state based on the power source configuration information.

The first connector component and the second connector component may be of the same type. The first connector component and the second connector component may be, for example, a Universal Serial Bus Type-C (USB Type-C) connector component, a Universal Serial Bus Lightning connector component, a Universal Serial Bus Type-B (USB Type-B or Micro USB-B) connector component, a Universal Serial Bus Type-A (USB Type-A or Micro USB-A) connector component, a mini Universal Serial Bus (Mini USB) component, etc.

In an example, the connector may be fixed in a non-detachable manner according to the second connector component and second electronic device. That is, the end of the connector connected to the second electronic device may be fixed on the second electronic device, so as to be integrated with the second electronic device.

Figure 3:
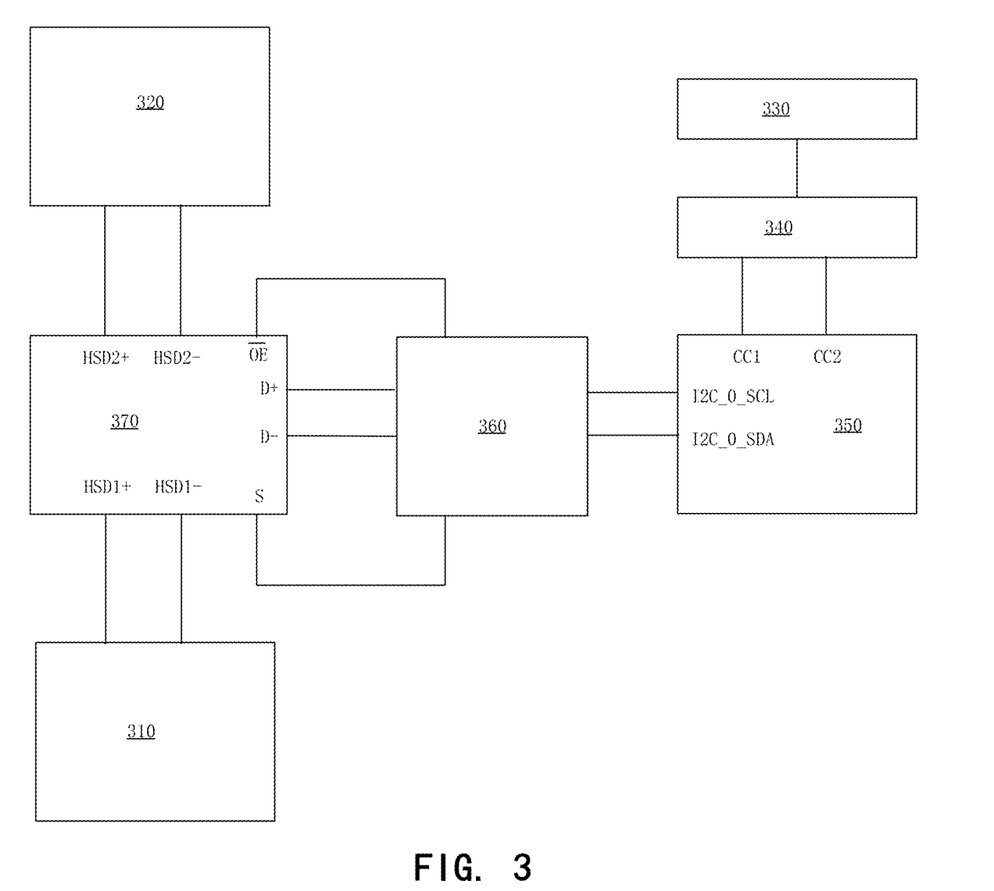
FIG. 3 is a schematic diagram of circuit connection relationship when a connector connects a first electronic device to a second electronic device according to another embodiment of the present disclosure.

FIG. 3 is a schematic diagram of circuit connection relationship when a connector according to another embodiment of the present disclosure connects a first electronic device to a second electronic device. In FIG. 3, as an example, a power-supplying state detection circuit 350 is implemented based on a CCG2 chip, and the second adaptation circuit for coupling with the second connector component in a second electronic device 320 is implemented based on a CCG3 chip, and a signal switch circuit 370 is implemented based on the signal switch chip UM7222. A power-supplying control circuit 360 may be implemented by any control device, such as single-chip microcomputer, programmable logic device, microprocessor, and Field Programmable Gate Array (FPGA), etc. In an embodiment, the power-supplying control circuit 360 is implemented based on a control device with USB host capability. The above-mentioned chips are only listed to illustrate the implementation examples of the connector in detail, and the embodiments of the present disclosure are not limited thereto, and may be implemented by any electronic device capable of implementing the circuit functions of the present disclosure. For example, the signal switch circuit 370 may also be implemented by any other signal switch device, and the power-supplying state detection circuit and the second adaptation circuit of the second electronic device may also be implemented based on any electronic device capable of implementing the PD protocol and data transmission. In addition, FIG. 3 only illustrates the connection relationship for explaining the solution of the present disclosure, and other devices or connection relationships are omitted.

As shown in FIG. 3, a power source 330 may be coupled with the third connector component 340 through the power connector component. The data terminal of the third connector component 340 is connected to a CC line of the CCG2 chip in the power-supplying state detection circuit 350 to transmit a power source connection message to the CCG2. A I2C data port of the power-supplying state detection circuit 350 is connected to a data receiving port of the power-supplying control circuit 360 to send a power source connection message to the power-supplying control circuit 360. A switch control port of the power-supplying control circuit 360 is connected to a switch state control port $\overline{OE}$ and S of the signal switch circuit 370 to control the switch state of the signal switch circuit 370. A first data ports HSD1+ and HSD1− of the signal switch circuit 370 are connected to a first electronic device 310 via the first data line portion, the second data ports HSD2+ and HSD2− are connected to a second electronic device 320 of the second electronic device via a first data line, and the third data ports D+ and D− are connected to a data output port of the power-supplying control circuit 360.

The power-supplying control circuit 360 controls a state of the signal switch circuit 370 by outputting a switch state control signal to the switch state control port $\overline{OE}$ and S. When the connection of power source 330 is not detected, the first data ports HSD1+ and HSD1− are connected to the second data ports HSD2+ and HSD2−. When the connection of power source 330 is detected, the second data ports HSD1+ and HSD1− are connected to the third data ports D+ and D−, so that the power-supplying control circuit 360 may transmit a power source connection message to the second electronic device 320 via the first data line. The power-supplying control circuit 360 may also cause the first data ports HSD1+ and HSD1− to be connected to the third data ports D+ and D−, so that the power-supplying control circuit 360 may transmit a power source connection message to the first electronic device 310 via the first data line. Then, after a power source message is sent to the first electronic device 310 or the second electronic device 320, the second data ports HSD2+ and HSD2− are connected to the first data ports HSD1+ and HSD1−.

In the example shown in FIG. 3, a signal transmitted between the power-supplying state detection circuit 350 and the power-supplying control circuit 360 is in an I2C signal format, and as for the power source connection message, a USB format message (e.g., a USB 2.0 message) is sent. Therefore, the power-supplying control circuit 360 may convert a received I2C format message into a USB format message, and then send it to the second electronic device 320 via the first data line.

Figure 4:
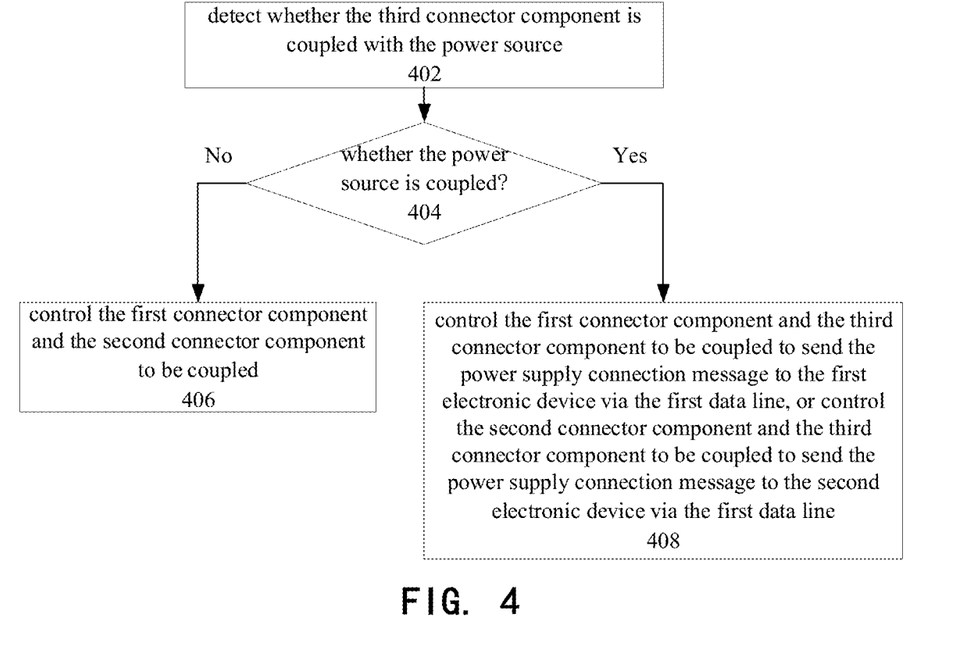
FIG. 4 is a flowchart of a method for charging control with a connector according to an embodiment of the present disclosure.

FIG. 4 is a flowchart of a method for charging control with a connector according to an embodiment of the present disclosure.

As shown in FIG. 4, at block 402 and block 404, it is detected whether the third connector component is coupled with the power source.

When it is not detected that the third connector component is coupled with the power source, at block 406, it is controlled that the first connector component is coupled with the second connector component via the first data line.

When it is detected that the third connector component is coupled with the power source, at block 408, it is controlled that the first connector component is coupled with the third connector component via the first data line to send the power source connection message to the first electronic device via the first data line, or it is controlled that the second connector component is coupled with the third connector component via the first data line to send the power source connection message to the second electronic device via the first data line. the power source connection message is for indicating that the third connector component is coupled with the power source.

The embodiments of the connector and the method for power-supplying control with the connector according to the present disclosure have been described above with reference to FIGS. 1 to 4. Respective embodiments in this description are described in a progressive manner, and the same or similar parts among the various embodiments are referenced to each other.

The foregoing describes specific embodiments of the description. Other embodiments are within the scope of the appended claims. In some cases, the actions or steps set forth in the claims may be performed in a different order than that in the embodiments and still achieve desired results. In addition, the processes described in the accompanying drawings do not necessarily require the illustrated specific order or sequential order to achieve the desired result. In certain implementations, multitasking and parallel processing are also possible or may be advantageous.

Not all steps and units in the processes and system structure diagrams described above are necessary, and some steps or units may be omitted according to actual needs. The performance order of each step is not fixed, and may be determined as needed. The apparatus structure described in the foregoing embodiments may be a physical structure or a logical structure, that is, some units may be implemented by a same physical entity, or some units may be implemented by multiple physical entities separately, or may be jointly implemented by some parts in multiple independent devices.

The term "exemplary" used throughout the description means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the accompanying drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A connector for coupling a first electronic device and a second electronic device with a power source to enable the power source to provide a current to the first electronic device and the second electronic device, wherein the first electronic device is able to communicatively be connected to the second electronic device via the connector and supply power to the second electronic device, and the connector comprises:

a first connector component configured to be coupled with the first electronic device;

a second connector component configured to be coupled with the second electronic device;

a third connector component configured to be coupled with the power source;

a power line configured to be coupled with the first connector component, the second connector component, and the third connector component;
a first data line configured to operatively couple any two of the first connector component, the second connector component, and the third connector component via a signal switching circuit; and
the signal switching circuit is configured to:
  detect whether the third connector component is coupled with the power source;
  control the first connector component and the second connector component to be coupled via the first data line when it is not detected that the third connector component is coupled with the power source; and
  when it is detected that the third connector component is coupled with the power source:
    control the first connector component and the third connector component to be coupled via the first data line, to send a power source connection message to the first electronic device via the first data line; or
    control the second connector component and the third connector component to be coupled via the first data line, to send a power source connection message to the second electronic device via the first data line,
    wherein, the power source connection message is configured to indicate that the third connector component is coupled with the power source.

2. The connector of claim 1, further comprising: a second data line coupling the first connector component with the second connector component.

3. The connector of claim 1, wherein the signal switching circuit is further configured to:
  control the first connector component and the second connector component to be coupled via the first data line after sending the power source connection message to the first electronic device or the second electronic device via the first data line.

4. The connector of claim 3, wherein the power source connection message also comprises power source configuration information.

5. The connector of claim 1, wherein the power line is operatively coupled with the third connector component via the signal switching circuit, and the signal switching circuit is further configured to:
  obtain a power-supplying state of the first electronic device at which the first electronic device supplies power to the second electronic device via the power line after sending the power source connection message to the first electronic device or the second electronic device via the first data line; and
  cause the third connector component to be coupled with the power line in response to the first electronic device stopping supplying power to the second electronic device via the power line, to enable the power source to supply power to the first electronic device and the second electronic device.

6. The connector of claim 1, wherein the first connector component and the second connector component are of the same type.

7. The connector of claim 6, wherein each of the first connector component and the second connector component is any one of:
  a Universal Serial Bus Type-C connector component;
  a Universal Serial Bus Lightning connector component;
  a Universal Serial Bus Type-B connector component;
  a Universal Serial Bus Type-A connector component; and
  a Mini Universal Serial Bus component.

8. The connector of claim 1, wherein the connector is fixed in a non-detachable manner according to the second connector component and the second electronic device.

9. The connector of claim 1, wherein the signal switching circuit is arranged adjacent to the first connector component or the second connector component.

10. The connector of claim 2, wherein the first data line, the second data line, and the power line are integrated into a connecting cable.

11. The connector of claim 10, wherein the connecting cable is formed as a branched connecting cable, the first connector component is located at a first end of the connecting cable, the second connector component is located at a second end of the connecting cable, and the third connector component is located at a branch end of the connecting cable.

12. The connector of claim 10, further comprising a housing capable of accommodating the first electronic device, wherein the connecting cable is fixed on the housing, and the second connector component extends outward from the housing.

13. The connector of claim 10, wherein the signal switching circuit is arranged within the connecting cable.

14. The connector of claim 1, wherein the second electronic device is a wearable augmented reality device or a wearable virtual reality device.

15. The connector of claim 11, wherein the signal switching circuit is arranged within the connecting cable.

16. The connector of claim 12, wherein the signal switching circuit is arranged within the connecting cable.

17. The connector of claim 2, wherein the second electronic device is a wearable augmented reality device or a wearable virtual reality device.

18. The connector of claim 3, wherein the second electronic device is a wearable augmented reality device or a wearable virtual reality device.

19. The connector of claim 4, wherein the second electronic device is a wearable augmented reality device or a wearable virtual reality device.

20. A method for power-supplying control with a connector for coupling a first electronic device and a second electronic device with a power source to enable the power source to provide a current to the first electronic device and the second electronic device, wherein the first electronic device is able to communicatively be connected to the second electronic device via the connector and supply power to the second electronic device, and the connector comprises:
  a first connector component configured to be coupled with the first electronic device;
  a second connector component configured to be coupled with the second electronic device;
  a third connector component configured to be coupled with the power source;
  a power line configured to be coupled with the first connector component, the second connector component, and the third connector component;
  a first data line configured to operatively couple any two of the first connector component, the second connector component, and the third connector component via a signal switching circuit; and
  the signal switching circuit is configured to:
    detect whether the third connector component is coupled with the power source;

control the first connector component and the second
   connector component to be coupled via the first data
   line when it is not detected that the third connector
   component is coupled with the power source; and
when it is detected that the third connector component
   is coupled with the power source:
   control the first connector component and the third
      connector component to be coupled via the first
      data line, to send a power source connection
      message to the first electronic device via the first
      data line; or
   control the second connector component and the
      third connector component to be coupled via the
      first data line, to send a power source connection
      message to the second electronic device via the
      first data line,
wherein, the power source connection message is configured to indicate that the third connector component is coupled with the power source;
wherein the method comprises:

detecting whether the third connector component is
   coupled with the power source;
controlling the first connector component and the second
   connector component to be coupled via the first data
   line when it is not detected that the third connector
   component is coupled with the power source; and
when it is detected that the third connector component is
   coupled with the power source:
   controlling the first connector component and the third
      connector component to be coupled via the first data
      line, to send a power source connection message to
      the first electronic device via the first data line; or
   controlling the second connector component and the
      third connector component to be coupled via the first
      data line, to send a power source connection message
      to the second electronic device via the first data line,
   wherein, the power source connection message is configured to indicate that the third connector component is coupled with the power source.

* * * * *